United States Patent
De Lathauwer (10) Patent No.: US 12,241,476 B2
(45) Date of Patent: Mar. 4, 2025

(54) COOLING FAN ASSEMBLY

(71) Applicant: CNH Industrial Belgium N.V., Zedelgem (BE)

(72) Inventor: Tom De Lathauwer, Lede (BE)

(73) Assignee: CNH Industrial Belgium N.V., Zedelgem (BE)

( * ) Notice: Subject to any disclaimer, the term of this patent is extended or adjusted under 35 U.S.C. 154(b) by 0 days.

(21) Appl. No.: 18/641,549

(22) Filed: Apr. 22, 2024

(65) Prior Publication Data
US 2024/0352943 A1 Oct. 24, 2024

(30) Foreign Application Priority Data

Apr. 21, 2023 (EP) ..................................... 23169287

(51) Int. Cl.
| | |
|---|---|
| *F04D 29/063* | (2006.01) |
| *F04D 29/32* | (2006.01) |
| *F04D 29/36* | (2006.01) |
| *F04D 29/38* | (2006.01) |
| *A01D 41/12* | (2006.01) |

(52) U.S. Cl.
CPC ......... *F04D 29/362* (2013.01); *F04D 29/329* (2013.01); *F04D 29/384* (2013.01); *A01D 41/12* (2013.01)

(58) Field of Classification Search
CPC .............................. F04D 29/362; F04D 29/329
See application file for complete search history.

(56) References Cited

U.S. PATENT DOCUMENTS

| | | | |
|---|---|---|---|
| 1,779,050 A | | 10/1930 | Schroder |
| 3,169,582 A | * | 2/1965 | Schilder ................ F04D 29/362 416/168 R |
| 3,684,398 A | | 8/1972 | Davidson |
| 7,134,406 B1 | | 11/2006 | Loes |
| 9,605,583 B2 | | 3/2017 | Goering |
| 9,622,408 B1 | | 4/2017 | Miller |

(Continued)

FOREIGN PATENT DOCUMENTS

| | | |
|---|---|---|
| CN | 109236738 A | 1/2019 |
| DE | 2313070 A1 | 9/1974 |

(Continued)

OTHER PUBLICATIONS

Extended European Search Report prepared for EP Application No. 23169287.2 dated Oct. 16, 2023 (5 pages).

*Primary Examiner* — Sabbir Hasan
(74) *Attorney, Agent, or Firm* — Peter K. Zacharias; Rebecca L. Henkel; Rickard K. DeMille (57) ABSTRACT

A fan assembly includes two or more axial flow fans rotatably mounted on a support structure. The fans are of the adjustable pitch type, i.e., each fan includes a pitch adjustment mechanism that is actuatable by axially shifting a positioning rod extending outward from the hub of the fan. The assembly further includes a control member and a plurality of adjustment mechanisms coupled respectively to the positioning rods and to the control member in such a way that the position of the control member determines the axial position of the positioning rods and thereby the pitch of the blades of all the fans of the assembly. A single actuator is configured to actuate a movement of the control member.

15 Claims, 6 Drawing Sheets

(56) References Cited

U.S. PATENT DOCUMENTS

| | | |
|---|---|---|
| 9,752,492 B2 | 9/2017 | Sheidler |
| 11,091,026 B2 | 8/2021 | Mussack |
| 11,162,507 B2 | 11/2021 | Miller |
| 2004/0067135 A1 | 4/2004 | Mccallum |
| 2008/0095627 A1* | 4/2008 | Castillo ................. F04D 29/362 |
| | | 416/147 |
| 2017/0067480 A1 | 3/2017 | Mccallum |
| 2020/0025208 A1 | 1/2020 | Miller |
| 2021/0372316 A1 | 12/2021 | Muttepawar |

FOREIGN PATENT DOCUMENTS

| | | |
|---|---|---|
| DE | 102004035631 A1 | 2/2006 |
| EP | 361982 A2 | 4/1990 |
| EP | 595420 A1 | 5/1994 |
| EP | 972129 B1 | 1/2003 |
| EP | 1798420 A2 | 6/2007 |
| EP | 2694787 B1 | 7/2015 |
| EP | 3012430 A1 | 4/2016 |
| EP | 2914855 B1 | 11/2016 |
| EP | 3114918 B1 | 5/2018 |
| EP | 3230567 B1 | 1/2019 |
| EP | 3103319 B1 | 1/2020 |
| EP | 2971791 B1 | 7/2021 |
| EP | 4051888 B1 | 12/2023 |
| JP | S58138300 A | 8/1983 |
| JP | 2008038820 A | 2/2008 |
| WO | 2006130987 A1 | 12/2006 |

* cited by examiner

COOLING FAN ASSEMBLY

FIELD OF THE INVENTION

The present invention is related to a cooling fan assembly for cooling the radiator of an internal combustion engine. The assembly according to the invention is in particular suitable for use in a large work machine such as a combine harvester.

BACKGROUND OF THE INVENTION

Work machines are generally equipped with an internal combustion engine provided with a cooling system comprising a liquid coolant that flows through a cooling circuit. Coolant that is heated in the engine is cooled in a radiator by an air flow generated by a cooling fan. Cooling fans used in such configurations are usually of the axial flow type, having radially oriented blades which can be adjusted by adjusting the inclination angle, also referred to as the pitch of the blades. This adjustment allows to control the air flow rate and thereby the cooling power of the fan. Usually, the range of the pitch is such that the adjustment also allows to reverse the direction of the air flow, i.e. towards or away from the radiator. Reversing the air flow can be used to clean the accumulated dust/dirt in the radiator by blowing it out of the radiator. In large work machines such as combine harvesters, the dimensions and shape of the radiator may require the use of several cooling fans.

Mechanisms for controlling the pitch can be hydraulic, pneumatic or mechanical. The hydraulic and pneumatic systems are reliable but expensive and technically complex, requiring high-quality sealing elements to avoid leakage of the working fluid. A known mechanical system is shown for example in patent publication document U.S. Pat. No. 3,169,582, which discloses a system wherein the fan blades are mounted on rotatable cylinders actuated by small levers, the orientation of which can be controlled by changing the axial position of a positioning disc. The disc is axially coupled to a non-rotatable positioning rod extending outward from the fan. The blade pitch can be adjusted by moving the positioning rod along its axial direction, which could be done by coupling an electric actuator to the positioning rod.

In current cooling systems involving multiple fans, the control of the blade pitch of the different fans is realized by separate control lines, either hydraulic/pneumatic or electric, which is however a technically complex and expensive solution.

SUMMARY OF THE INVENTION

According to an aspect of the present invention, a cooling assembly comprises two or more axial flow fans rotatably mounted on a support structure. The fans are of the adjustable pitch type, i.e. each fan includes an adjustment mechanism for adjusting the pitch of the blades, that is actuatable by axially shifting a positioning rod extending outward from the hub of the fan.

A fan assembly according to the invention further comprises a movable control member and a plurality of adjustment mechanisms coupled respectively to the positioning rods and to the control member in such a way that the position of the control member determines the axial position of the positioning rods and thereby the pitch of the blades of all the fans of the assembly. A single actuator is configured to actuate a movement of the control member, either directly or through a suitable transmission.

The fan assembly is technically straightforward and less expensive than existing solutions. A single actuator commands the position of the blades of each fan of the assembly. The control member and the adjustment mechanisms for displacing the positioning rods represent a mechanical system for setting the blade pitch, requiring no extra hydraulic, pneumatic or electrical connections to the fans.

DETAILED DESCRIPTION OF EMBODIMENTS OF THE INVENTION

Embodiments will now be described with reference to the drawings. The detailed description is not limiting the scope of the invention, which is defined only by the appended claims.

Figure 1:
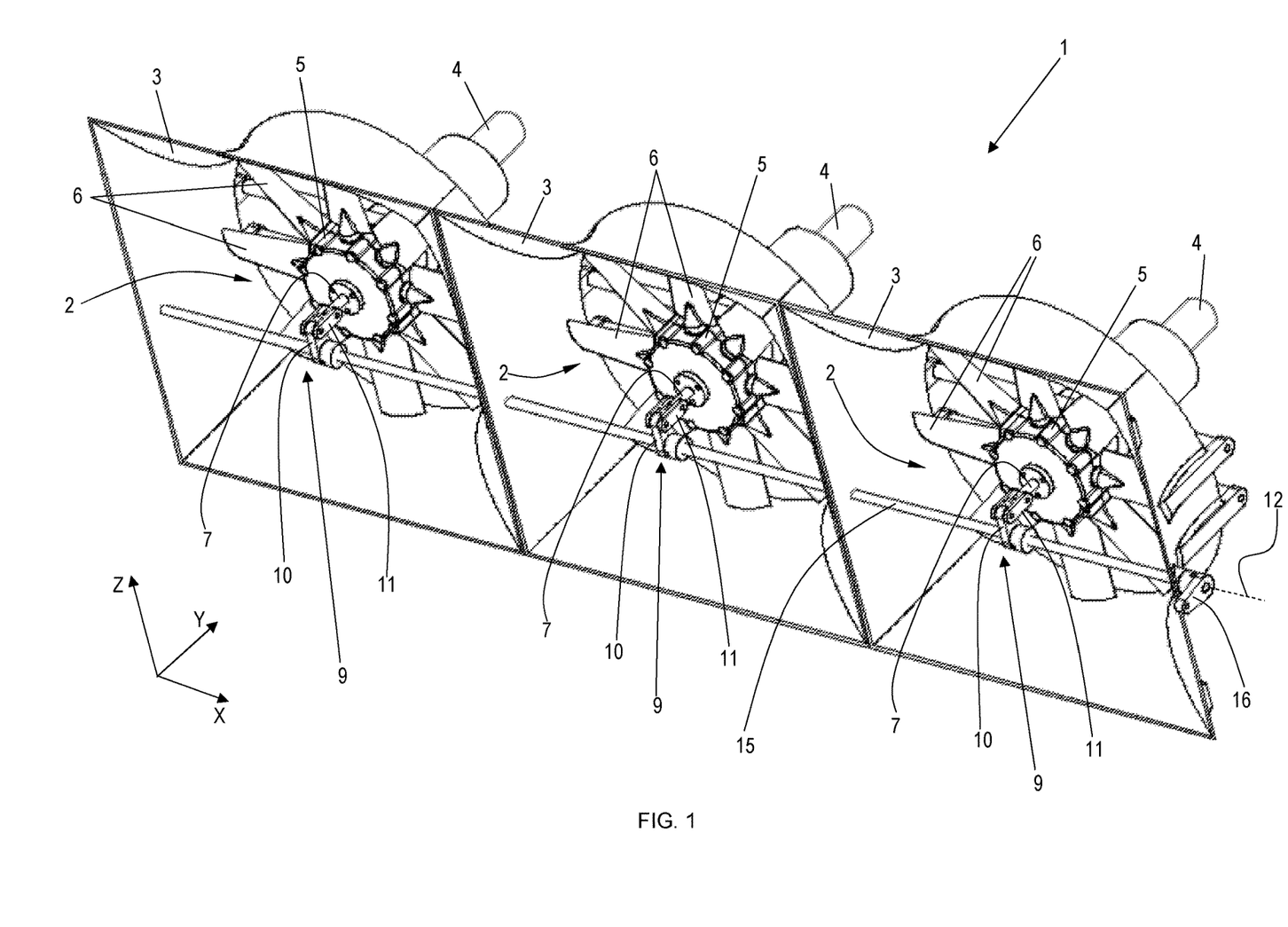
FIG. 1 is a 3D view of a cooling fan assembly according to an embodiment of the invention wherein the control member is a rotatable control rod.

FIG. 1 shows a cooling fan assembly 1 according to an embodiment of the invention, comprising three axial flow cooling fans 2 mounted side by side, for cooling the radiator (not shown) of an internal combustion engine of a large work machine such as a combine harvester, a forage harvester, a cotton harvester or a sugar cane harvester. The fans 2 have the same diameter in this embodiment but fans having different diameters are also possible as will be described later in this text. Each fan is mounted in a housing 3 having curved sidewalls for guiding the air flow generated by the fans 2. The cooling assembly 1 is configured to be mounted in front of the radiator of an internal combustion engine (not shown), the radiator having a rectangular surface corresponding more or less with the combined surface area of the adjacent housings 3 of the fans 2.

Each of the cooling fans 2 comprises a rotation axle 4 configured to be coupled to a drive configuration generally known in the art, for example a belt drive, or a set of electric motors, preferably but not necessarily configured to drive the rotation of the fans 2 at the same rotational speed. The axles 4 are rotatably mounted on a support structure (not shown), which may be the housing of the engine or a separate support mounted on the chassis of the work machine.

Each fan 2 comprises a hub 5, with fan blades 6 extending radially outward from the hub. The fan blades 6 are coupled to a mechanical system that is present inside the hub 5, for adjusting the pitch of the blades 6, i.e. the angular position of the blades about a radially oriented axis. To this aim, each blade 6 is mounted on a rotatable cylinder, the rotation of which is controlled by said mechanical system. The system may for example be a mechanism involving levers and a control disc, as disclosed in U.S. Pat. No. 3,169,582. The mechanism is actuated by changing the axial position of a non-rotatable positioning rod 7 mounted coaxially with respect to the rotation axle 4 of the fan. The range of the blade pitch is preferably large enough to enable the reversing of the flow direction of air flow generated by the fans 2, when the pitch is changed through its full range.

The positioning rod 7 of each fan 2 is adjustable through an adjustment mechanism 9. In the embodiment shown, this is a crank mechanism comprising a rotatable crank arm 10 and a connecting arm 11. The connecting arm 11 is rotatably coupled to the crank arm 10 at one end of said connecting arm 11 and to the positioning rod 7 at the other end, so that a rotation of the crank arm 10 about a fixed rotation axis 12 (i.e. fixed relative to the support structure) is translated into an axial displacement of the positioning rod 7, and hence to an adjustment of the pitch of the blades 6.

It is seen furthermore that the crank arms 10 of the three crank mechanisms 9 are aligned and interconnected by a control rod 15. The control rod 15 is rotatably mounted with respect to the support structure and in the embodiment shown, passes through a front portion of the housings 3. The central axis 12 of the control rod 15 coincides with the rotation axes of the crank arms 10 of the three crank mechanisms. The three crank arms 10 are fixed to the control rod 15, so that a rotation of the control rod 15 about its central axis 12 actuates a simultaneous rotation of the crank arms 10 and thereby a simultaneous adjustment of the pitch of the blades 6 of the three fans 2.

The control rod 15 is rotatably supported at at least two support points, for example at its two extremities, by suitable support means (not shown) such as rotary bearings or the like mounted in a fixed position relative to the support structure onto which the fans are mounted.

A lever 16 is attached to the control rod 15 at one extremity thereof. To illustrate the function of the lever 16, reference is made to FIG. 2 which shows a parallel projection on the YZ plane of the fan assembly of FIG. 1, in particular of the means for setting the pitch of the blades 6. The fans as such are not shown in full in FIG. 2, which only partly shows the aligned hubs 5. The crank mechanisms are also fully aligned and operating in phase. In reality, there may be a misalignment or a phase difference between these mechanisms and/or a difference in the dimensions between corresponding elements, such as the crank arms 10, the connecting arms 11 or the axially movable positioning rods 7. What counts in this embodiment is that all the crank mechanisms 9 are coupled to the same control rod 15.

Figure 2:
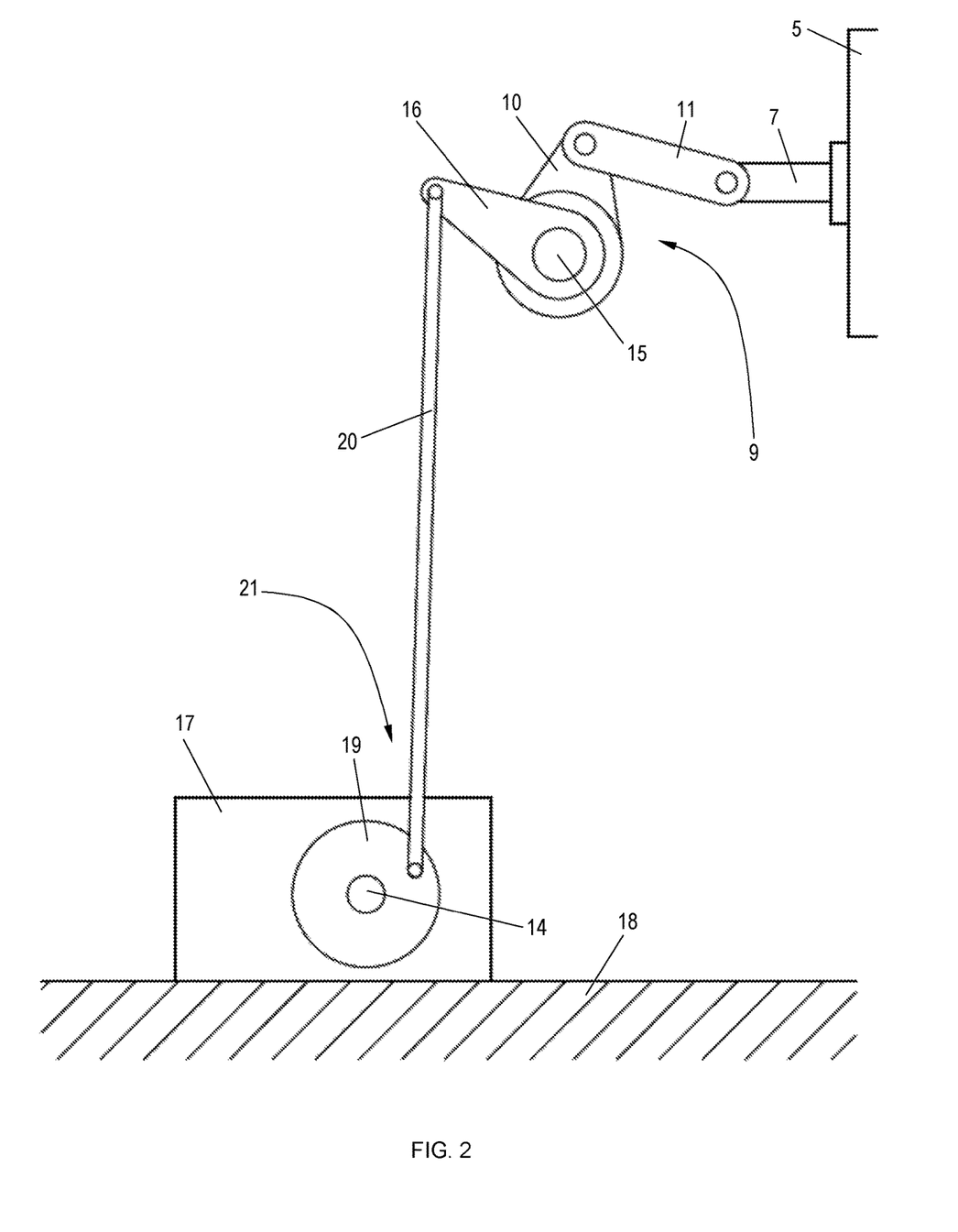
FIG. 2 is a side view of the embodiment of FIG. 1, including an actuator for adjusting the pitch of the blades of the fans.

As illustrated in FIG. 2, the lever 16 is connected to an actuator 17 mounted on the support structure or on a surface 18 that is uniform with or fixed to said support structure, for example on the chassis of the work machine. The actuator 17 may be an electric motor configured to drive the rotation of a disc 19 mounted on the outlet axle 14 of the motor. A pin 20 is rotatably coupled to the disc 19 at one end of said pin and also rotatably coupled to the lever 16 at the other end, so that the angular position of the disc 19 controls the angular position of the lever 16 and thereby of the control rod 15. In other words, the disc 19 and pin 20 act as a further crank mechanism 21 configured to rotate the lever 16 and thereby the control rod 15. In this way, a single actuator 17 is used to control the pitch of the blades of all the fans of the assembly.

This solution is technically straightforward and less expensive than the current control systems for setting the pitch of multiple blades. The pitch of all the blades is adjustable through a single actuator and a reliable mechanical connection comprising, in the embodiment shown, a plurality of crank mechanisms 9 and a control rod 15. No hydraulic, pneumatic or electrical connections directly coupled to the fans are required.

The invention is however not limited to the embodiment illustrated in FIGS. 1 and 2. The manner in which the control rod 15 is rotated may differ from the illustrated embodiments, and the actuator used to actuate this rotation may be any suitable actuator known in the art, including hydraulic or pneumatic actuators. Instead of a crank mechanism 21 including the disc 19 and pin 20, the movement of the lever 16 can be actuated by any other suitable mechanism, for example by a variable length actuator that is rotatably mounted on the support structure, and coupled (also rotatably) to the lever 16.

The rotation of the control rod 15 could be actuated by other means than the lever 16. Any suitable transmission could be mounted between the output axle 14 of actuator 17 and the control rod 15 for driving the rotation of the latter, for example a gear transmission or a belt drive. Another alternative is to place the actuator 17 at the same height as the control rod 15 and to directly couple said control rod 15 to the output axle 14 of the actuator 17.

Instead of the crank mechanisms 9 comprising the crank arms 10 and connecting arms 11, any other suitable mechanical adjustment mechanism may be used for displacing the positioning rods 7, for example a rack and pinion drive including a circular gear (pinion) coaxially fixed to the control rod 15 and a linear gear (rack) for transferring the rotation of the control rod 15 into an axial displacement of the positioning rod 7. Another transmission could include a worm drive with a worm wheel and a worm.

Figure 3:
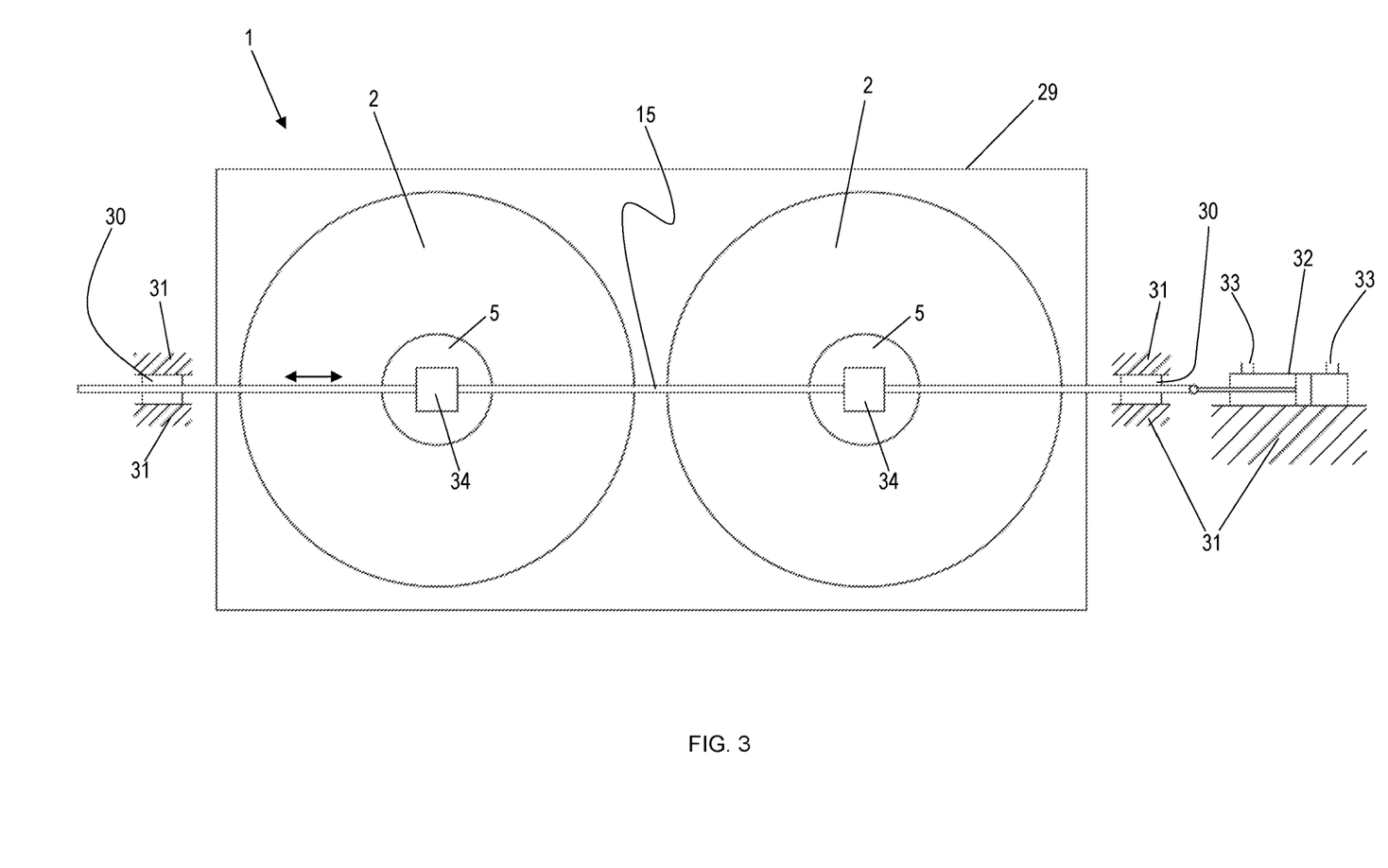
FIG. 3 illustrates an alternative embodiment wherein the control member is an axially displaceable control rod.

According to another embodiment of the invention, the control rod 15 is not rotatable but it is displaceable axially in the direction of its longitudinal central axis 12. Such an embodiment is illustrated in FIG. 3, showing a fan assembly comprising two fans 2 of equal diameter positioned before a radiator whose surface area is delimited by the rectangle 29. The image shows only the hubs 5 of the fans and a larger circle indicating the outer diameter of the fans. The control rod 15 is slidably supported by two slide bearings 30 mounted on the support structure, symbolized in FIG. 3 by the hatched areas 31. Also mounted on the support structure 31 is a variable length actuator 32. The actuator is connected to one extremity of the control rod 15 so as to drive an axial movement of the rod. In the embodiment shown, the actuator 32 is a hydraulic variable length actuator with input and output ports 33 for a hydraulic fluid, configured to actively drive the movement of the rod 15 in either of the two opposite directions. Alternatively it may be an electrically driven variable length actuator. Another alternative is to connect one extremity of the rod 15 to a single-direction hydraulic or electric variable length actuator and to couple the other extremity to a spring so that movement in one axial direction may be actuated by the actuator and the movement in the opposite direction may be actuated by the spring force. In the latter embodiment, the control rod 15 could be replaced by a cable or wire tensioned between the actuator at one end and a suitably arranged spring at the other end. Both the control rod 15 (rotatable or displaceable axially) and a tensioned cable or wire are embodiments of the 'control member' referred to in the appended claims.

The axially displaceable rod 15 (or cable/wire in alternative embodiments) is coupled to adjustment mechanisms 34, represented symbolically by squares in FIG. 3. These mechanisms are coupled also to the positioning rods 7 of the fans 2. These mechanisms are configured to transform an axial displacement of the rod 15 (or cable/wire) into an axial displacement of the positioning rods 7, i.e. in an axial displacement oriented essentially perpendicularly to the actuating displacement. Various possible embodiments of such mechanisms can be used here, two examples of which are illustrated in FIGS. 4 and 5.

Figure 4:
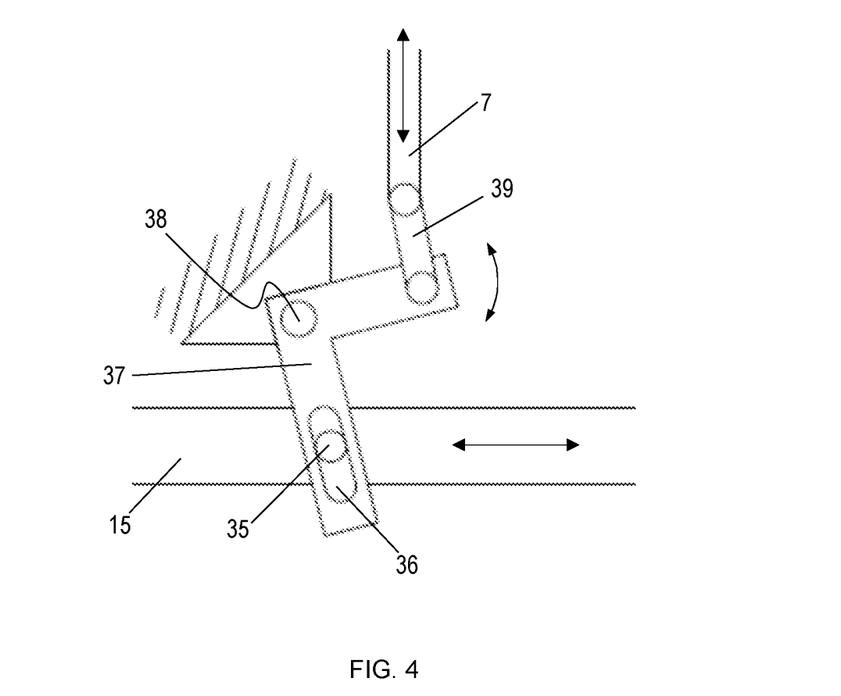
FIGS. 4 and 5 illustrate embodiments of a suitable adjustment mechanism for adjusting the position of the positioning rods of the fans, when the control rod is axially displaceable.
Figure 5:
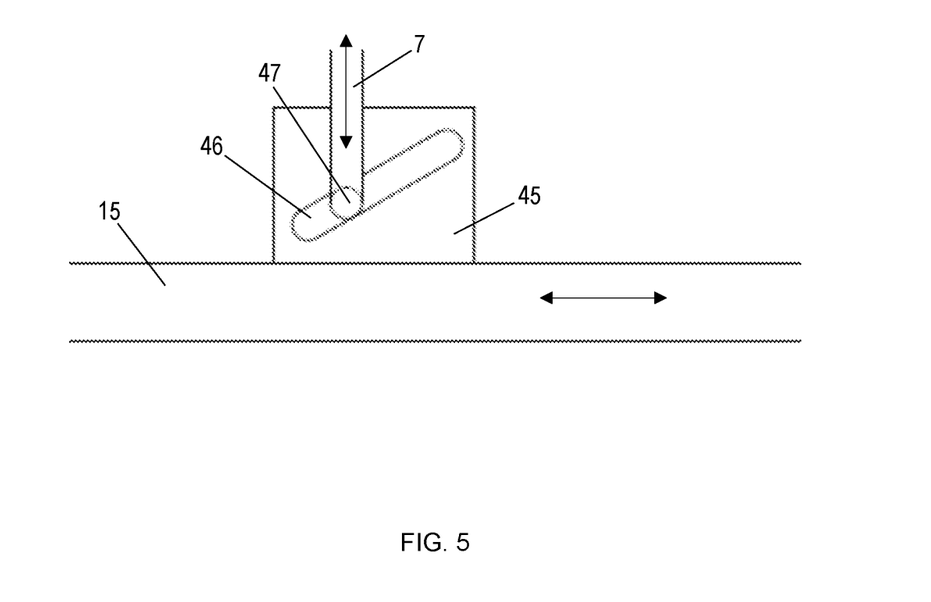

Both FIGS. 4 and 5 show a view from the top. In the mechanism illustrated in FIG. 4, the axially displaceable control rod 15 comprises an upwardly oriented pin 35 that is slidably arranged in a groove 36 provided in one leg of an L-shaped bracket 37. The bracket 37 is pivotable relative to the support structure 31 about upright pivot axis 38. A connecting arm 39 is rotatably coupled to the other leg of the bracket 37 at one end of said arm 39 and to the positioning rod 7 of one of the fans 2 at the other end of the arm 39. As indicated by the arrows in FIG. 4, the axial displacement of the rod 15 is transferred to a rotation of the bracket 37 and hence to an axial shift of the positioning rod 7. When all the displacement mechanisms 34 are executed according to FIG. 4, the brackets 37 of these mechanisms could be coupled to respective springs when the control rod 15 is coupled to a single-direction variable length actuator. The springs are then configured to actuate the axial movement of the rod in the direction opposite the direction of movement actuated by the actuator.

The mechanism illustrated in FIG. 5 includes a block 45 fixed to the axially displaceable rod 15. The block 45 is provided with a slanted groove 46 into which an upright pin 47 is slidably arranged. The pin 47 is attached to the positioning rod 7 of one of the fans 2. The pin 47 interacts with the groove 46 in the way of a cam system that transfers an axial displacement of the control rod 15 into an axial displacement of the positioning rod 7, the displacement of the positioning rod 7 being oriented perpendicularly to the displacement of the control rod 15.

Figure 6:
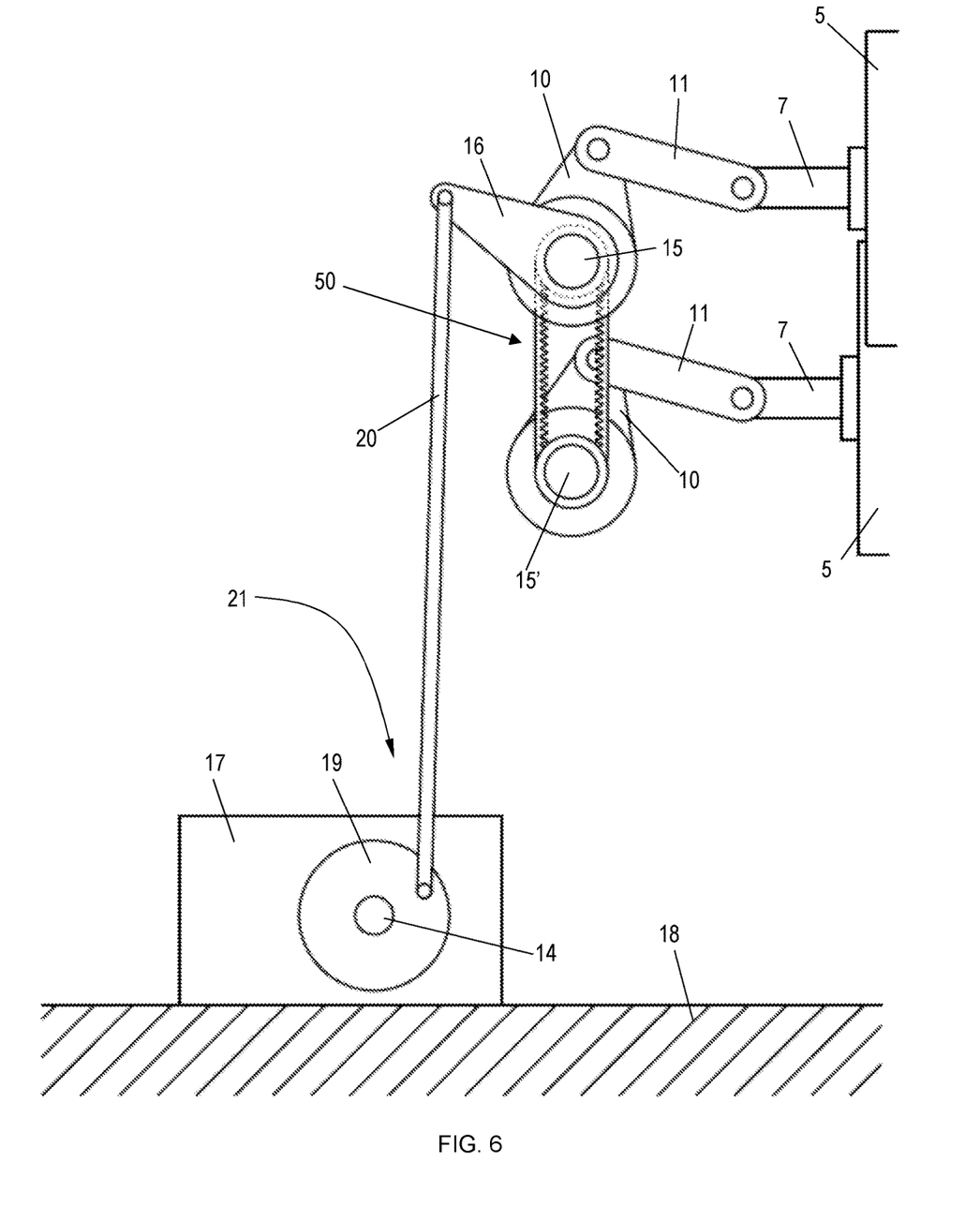
FIG. 6 is a side view of a pitch adjustment system of a fan assembly according to an embodiment of the invention, wherein one of the fans is mounted at a different height than the other fans of the assembly.

In the embodiment of FIGS. 1 to 3, the fan assembly comprises a single control rod 15, while a component of each adjustment mechanism 9 or 34, for example the crank arm 10 in FIG. 2, or the block 45 in FIG. 5, is directly fixed to the control rod 15. While this is a straightforward embodiment in terms of the needed amount of components, it requires the fans 2 of the assembly to be placed more or less at the same height level. FIG. 6 illustrates an embodiment wherein one of the fans 2, including its rotation axle, is located at a lower level than the other fans of the assembly. The fan assembly now includes an additional control rod 15', in addition to the main control rod 15 which is still directly coupled to the lever 16. The additional control rod 15' is essentially parallel to the main control rod 15, located below said main control rod 15 and rotatably coupled thereto by a transmission 50, in this case a toothed belt drive, although any other transmission can be used, for example a gear transmission. The transmission 50 drives the rotation of the additional control rod 15' at the same rotational speed as the main control rod 15, so that the adjustment of the blade pitch of the lower fan is performed at the same adjustment rate as the higher positioned fan or fans of the assembly. Although it is preferred to drive both control rods 15 and 15' at the same rotational speed, a speed difference may be applied, by applying a transmission that realizes a given speed ratio, for example a toothed belt drive including gear wheels of different diameter.

Figure 7:
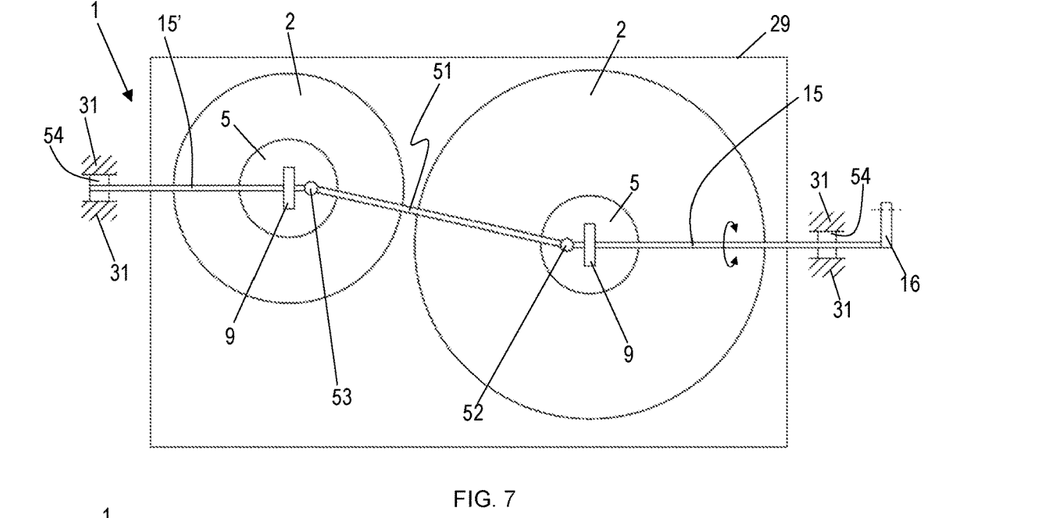
FIGS. 7 and 8 illustrate further embodiments including fans placed at different heights.

An variant of the embodiment of FIG. 6 is illustrated in FIG. 7. This figure again uses a simplified frontal representation of the assembly, facing a radiator of circumference 29, and now comprising two fans 2 of different diameters and with the rotation axis of the smaller fan placed higher than the rotation axis of the larger fan. The main control rod 15 comprising the lever 16 at its outer end is indicated. The lever 16 is configured to be coupled to an actuator (not shown) in the manner described above or equivalent thereto, for actuating the rotation of the main control rod 15 about its central axis. The higher placed fan is again coupled to an additional control rod 15', but now the rotation of the main control rod 15 is transferred to the rotation of the additional rod 15' by a cardan shaft 51, connected to the main and additional rods 15,15' by respective universal joints 52 and 53. The control rods 15 and 15' are rotatable with respect to the support structure 31 via rotatable bearings 54. The cardan shaft 51 together with the universal joints 52,53 constitutes another embodiment of a transmission that transfers a rotation of the main control rod 15 to a rotation of the additional control rod 15'.

Figure 8:
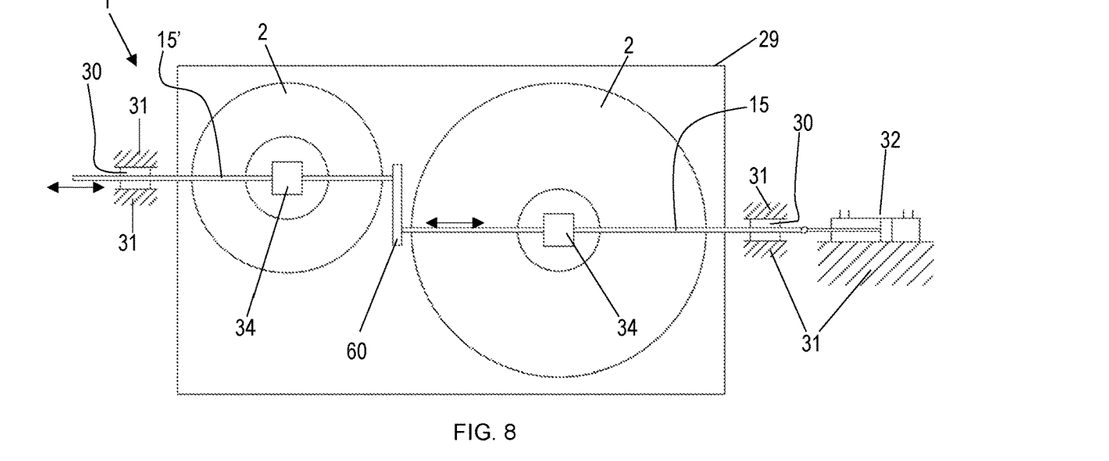

FIG. 8 illustrates an embodiment provided with an axially displaceable main control rod 15 coupled to a variable length actuator 32 as described above with reference to FIG. 3. The assembly also includes a larger fan and a smaller fan, the latter having its rotation axle at a higher level than the former. The main control rod 15 is coupled to the larger fan by an adjustment mechanism 34, which may be either of the mechanisms shown in FIG. 4 or 5 or any equivalent thereto. The assembly comprises an additional control rod 15' coupled to the smaller fan by a further adjustment mechanism 34. The two control rods 15,15' are connected by a vertical interconnect 60. In analogy with the transmission 50, the interconnect 60 may also be referred to as a transmission, transmitting the axial displacement of the main control rod 15 to the same displacement of the additional rod 15', to thereby adjust the pitch of the two fans 2 simultaneously.

Figure 9:
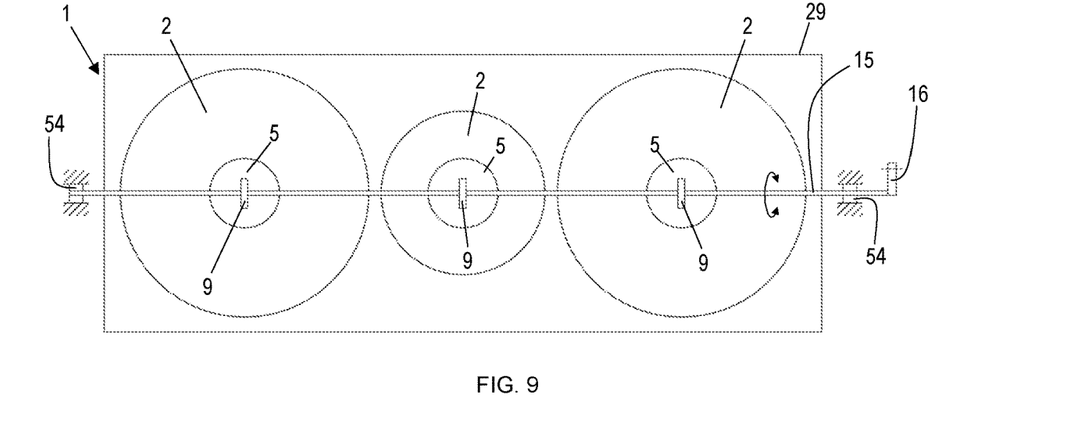
FIG. 9 illustrates an embodiment including fans placed at the same height and having different diameters.

According to embodiments of the invention and as already illustrated in FIGS. 7 and 8, the fans 2 of the fan assembly may have different diameters. FIG. 9 illustrates a further embodiment wherein the surface area of the radiator, indicated by the rectangle 29 is such that it is difficult to cover it by fans having the same diameter. The solution shown in FIG. 9 uses two fans 2 of the same diameter and an additional centrally placed fan 2 having a smaller diameter. The three fans 2 are coupled to a rotatable control rod 15 as described above, supported by two rotary bearings 54, and coupled to adjustment mechanisms 9 according to any one of the above-described embodiments. The control rod 15 comprises at one extremity the lever 16 coupled to a suitable mechanism (not shown) for driving the rotation of the control rod 15. Said mechanism may equally be in accordance with any one of the above-described embodiments.

The adjustment mechanisms 9 or 34, for example the crank mechanisms 10,11 for adjusting the positioning rods 7 of the fans may have different dimensions, or different types of adjustment mechanisms may be used for different fans, in order for example to realize—by the same rotation or by the same axial displacement of the control rod 15—a larger change in the blade pitch in one fan compared to another fan of the assembly, enabling a different air flow adjustment on different areas of the radiator.

The phase difference between the angular blade positions of different fans may be constant or variable depending on the exact configurations in terms of the types and dimensions of the adjustment mechanisms 9 or 34. Said phase difference may be zero so that all the fans always deliver the same air flow regardless of the position of the control member 15. Alternatively, a non-zero phase difference may be deliberately applied between two or more fans, enabling a difference in air flow rate. This also enables a sequential reversing of the flow direction when the fans are fully reversible, i.e. the fans sequentially reverse their flow direction, when the pitch of the blades is changed through its full range.

The invention claimed is:

1. A cooling fan assembly comprising:
a support structure;
a plurality of cooling fans, each fan comprising:
(i) an axle that is rotatable with respect to the support structure;
(ii) a hub that is uniform with or fixed to the axle;
(iii) blades extending outward radially with respect to the hub, wherein a pitch of the blades is adjustable by pivoting the blades about respective radial axes;
(iv) a mechanism mounted in the hub, for simultaneously adjusting the pitch of the blades; and
(v) a positioning rod oriented and movable in an axial direction of the fan, partially extending out of the hub, and coupled to the mechanism in such a way that an axial position of the positioning rod determines the pitch of the blades of the fan;
an actuator;
a control member that is movable relative to the support structure, and that is furthermore coupled to the actuator, so that the actuator is configured to drive a movement of the control member; and
a plurality of adjustment mechanisms, one for each fan, wherein each of the plurality of adjustment mechanisms is coupled to the positioning rod of a respective one of the plurality of cooling fans and to the control member, in such a way that movement of the control member simultaneously sets the axial position of each positioning rod and thereby the pitches of the blades of the plurality of cooling fans.

2. The cooling fan assembly according to claim 1, wherein the control member is an elongate member that is either rotatable about its central axis or axially displaceable.

3. The cooling fan assembly according to claim 2, wherein the control member is a control rod that is rotatable about its central axis, and wherein the actuator is configured to drive the rotation of the control rod.

4. The fan assembly according to claim 3, wherein each of the plurality of adjustment mechanisms is a crank mechanism, and wherein each crank mechanism comprises a crank arm and a connecting arm, the connecting arm being coupled to the positioning rod of a respective one of the plurality of cooling fans, so that the crank mechanism is configured to drive the axial movement of the positioning rod of the respective one of the plurality of cooling fans by rotating the crank arm.

5. The fan assembly according to claim 3, wherein the control rod comprises a lever and wherein the actuator is coupled to the lever.

6. The fan assembly according to claim 5, wherein the actuator is a motor comprising a rotatable outlet axle and wherein the axle is coupled to the lever by a crank mechanism.

7. The fan assembly according to claim 6, wherein the motor is an electric motor.

8. The fan assembly according to claim 3, wherein:
the control rod is a main control rod that is directly coupled to one or more of the plurality of adjustment mechanisms configured to displace the positioning rods of one or more first fans of the plurality of cooling fans,
the fan assembly further comprises an additional control rod that is directly coupled to one or more further ones of the plurality of adjustment mechanisms configured to adjust the blades of one or more second fans of the plurality of cooling fans placed at a different height level than the one or more first fans, and
the main control rod and the additional control rod are coupled by a mechanical transmission configured so that movement of the main control rod drives a movement of the additional control rod.

9. The fan assembly according to claim 3, wherein the control rod is axially displaceable along its central axis, and wherein the actuator is configured to drive an axial movement of the control rod.

10. The fan assembly according to claim 9, wherein the actuator is configured to drive the axial movement in one direction only, and wherein movement in the opposite direction is actuated by one or more springs.

11. The fan assembly according to claim 1, wherein the control member is a single member to which the plurality of adjustment mechanisms is directly coupled, in a sense that each of the plurality of adjustment mechanisms comprises a component that is fixed to or uniform with the control member.

12. The fan assembly according to claim 1, wherein a phase difference between the pitch of the blades of at least two of the plurality of cooling fans is different from zero.

13. The fan assembly according to claim 1, wherein at least two of the plurality of cooling fans have different diameters.

14. A work machine comprising an internal combustion engine equipped with a radiator and with a cooling fan assembly according to claim 1, arranged to produce a flow of air for cooling a liquid coolant flowing through the radiator.

15. The work machine according to claim 14, wherein the work machine is a combine harvester, a forage harvester, a cotton harvester or a sugar cane harvester.

* * * * *